April 24, 1945.  H. E. HEIGIS  2,374,200
AUTOMATIC INFLATION EQUIPMENT
Filed Sept. 27, 1941
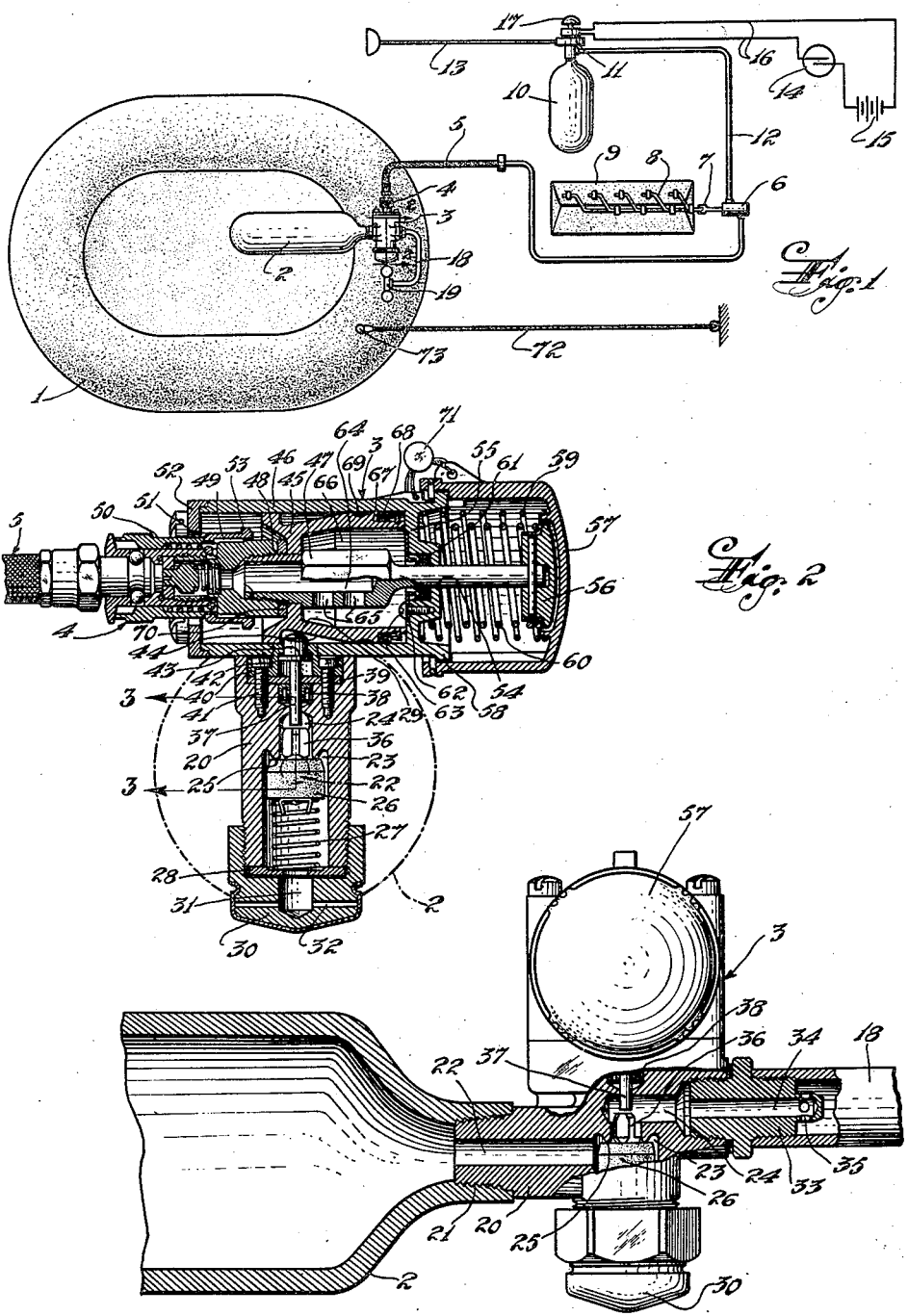
INVENTOR
Henry Ernest Heigis
BY Harry J. Moxer.
ATTORNEY Patented Apr. 24, 1945

2,374,200

UNITED STATES PATENT OFFICE 2,374,200

AUTOMATIC INFLATION EQUIPMENT

Henry Ernest Heigis, West Orange, N. J., assignor to Specialties Development Corporation, Bloomfield, N. J., a corporation of New Jersey Application September 27, 1941, Serial No. 412,581

11 Claims. (Cl. 9—11)

This invention relates to inflatable devices of the general type now extensively employed as marine life-saving apparatus, and is equally adapted to be used in connection with life-vests or belts for individual use, with life-boats or rafts for the use of one or more persons, and with other similar gear, provided quite generally on aircraft for emergency landings on water.

More specifically, the present invention has reference to inflatable flotation devices of the type comprising a fabric envelope formed with one or more compartments, which may be inflated by air or other suitable gas under pressure, such as liquid carbon dioxide.

The invention has for a general object, the improvement in the reliability and the speed of availability of such inflatable marine life-saving devices on aircraft.

In the event of a forced or prospective landing on water by an aircraft, or even in cases, where the aircraft has to be abandoned for some other reason, the necessity arises for a safe and quickly available means for transporting the crew over the water. This need has been filled heretofore by the provision on board the aircraft of a so called inflatable life-raft, a general example of which is disclosed in Letters Patent of the United States No. 2,040,616.

It is, accordingly, an object of this invention to provide inflatable life-raft equipment for use with aircraft, which is stored thereon in a deflated condition, and which may be conditioned for service, preferably, by means of automatic actuation in response to an immersion of the aircraft in water, partial or otherwise.

It is another object to provide a life-raft of the type referred to, which is encumbered with as little excess weight as possible.

A further object of the invention is to make it possible, as an alternative to automatic actuation, to initiate and to control the inflation of such a life-raft from a point on the aircraft easily accessible to the operator.

It is still another object to provide a life-raft which is adapted to be stored in a compact and space-saving manner, and which is adapted to be freed from its storage as part of the inflating operation.

It is also an object to completely separate the raft from its controls and connections on the aircraft upon its being inflated, so that it may be thrown overboard without any delay.

These, and further objects not specifically enumerated above, will be apparent when described in greater detail in connection with the accompanying drawing, wherein:

Figure 1 is a schematic view of a life-boat or raft inflating apparatus embodying the present invention, and showing the relationship of the various operating and control elements thereof.

Figure 2 is a sectional view, on the line 2—2 in Figure 1 of an inflation fluid release device and disconnecting means used in connection with an inflating fluid storage cylinder, as carried by the raft of Figure 1.

Figure 3 illustrates the relation of the device of Figure 2 to the fluid container, showing that device in a partial section on the line 3—3 and the fluid container in fragmentary longitudinal section.

Referring now to the drawing, in which similar characters of reference indicate corresponding parts, 1 is a floatable raft shown in its inflated condition, the constructional details of which do not form any part of this invention, and which may be of the type having two compartments shown in the United States patent mentioned above. At 2, a container for carbon dioxide under pressure is shown provided with a release device 3 for controlling the release of the fluid in the container, as will be described in detail in connection with Figures 2 and 3. At 4, an automatically acting coupling is shown connecting a hose 5 to the release device 3, the other end of the hose leading to a piston type fluid pressure motor 6, which also controls the entrance of pressure fluid into the hose, and which may, for instance, be of the type shown in Figure 2 of Letters Patent of the United States No. 2,052,186, and referred to therein by the reference $a^2$. The fluid motor 6 is adapted to operate by means of a linkage 7, a latch arrangement 8, controlling the closure of a compartment 9 for receiving the raft 1 in its deflated storage condition. The compartment 9 is shown closed, as when the raft 1 and the container 2 are stored therein with the hose 5 extending to the outside. The fluid medium, which is used to operate the fluid motor 6 and the control or release device 3, is stored in a control or operating fluid cylinder or container 10, disposed in the airplane, outside the raft, within easy reach of the operator. The control cylinder 10 is provided with a control device 11 for the release of the operating fluid into a conduit 12 connected to the fluid motor 6. This control device 11 is operable by alternative means, shown in the illustration to comprise a remote manual control, such as a cable pull 13, or an automatic electric control comprising an immersion responsive circuit closure device 14 forming a circuit with a battery 15 and conductors 16, and including an electro-responsive device in the control 11 adapted to actuate the fluid release mechanism thereof. An additional control, of the local manual type, such as a strike knob 17, may be provided on the control head 11. The entire device, if desired, may take the form of the electrical and cable-pull arrangements disclosed in Figures 2 and 3 of United States Patent No. 1,956,494, and the local manual actuator may be, as shown in Figure 1 of United States Patent No. 2,000,708. A suitable electrical immersion type actuator is also suggested in United States Patent No. 1,956,494. The inflating fluid, when released from the container 2, is caused to flow through a conduit 18 into a manifold 19, with which the two compartments of the raft communicate.

Referring to Figures 2 and 3, the inflating fluid container 2 is shown to be provided with a control head or release device 3, which, through the medium of the coupling 4, receives operating fluid from the hose 5 connected thereto. The control device 3 comprises a main body 20, which at 21 (Figure 3) is threadedly secured into the container 2. The body 20 is formed with an inlet passage 22 leading into a valve chamber 23. An outlet passage 24 in the body 20 communicates with the valve chamber 23, a valve seat 25 being formed intermediate the chamber and the outlet. A seat type valve 26 is held seated on the seat 25 by the pressure of the medium in the container 2, aided by a light reseating spring 27 (Figure 2). The other end of the spring 27 bears against a safety blow-out means 28 comprising a thin rupturable disc and a washer, held in place over a suitable aperture in the valve chamber 23 by a cap 30, which provides a balanced discharge in case of an over-pressure blow-out by way of passages 31 and 32. A balanced discharge for the fluid medium from the outlet passage 24 when released into the conduit 18 is obtained by the provision of a so-called recoil adapter 33, commonly used in connection with high pressure fluids, and, similarly to the cap 30, having a longitudinal axial passage 34 and radial passages 35, at its end. The valve 26 has a projection 36, which serves as a guide for the valve in the outlet passage, and at the same time, as a means of actuation, when the valve is being unseated through the depression of an actuating pin 37. The actuating pin 37 extends into the outlet passage 24 through a suitable aperture in the upper part of the valve body 20. A packing gland, comprising a sealing ring 38, a washer 39, and a retaining gland 40, disposed in suitable recesses of the last named aperture of the valve body and held in place therein by means of screws 41, provides a seal preventing any escape of fluid past the actuating pin 37 (Figure 3). The retaining gland is formed with a centrally apertured and recessed projection 42, which provides a cylindrical chamber for the stroke of a flanged upper portion 43 of the pin 37. The upper portion 43 of the pin 37 is formed with a knob-like member 29, which normally extends out through the aforesaid formation 42, and is adapted to be engaged by a cam surface 44 formed on a piston 45. The piston 45 is slidably disposed in a valve actuator housing 46, secured to the valve body 20. A member 47 is disposed along the central longitudinal axis of the housing 46, extending on both sides of the piston 45 through a suitable opening 48 therein. The member 47 on one side, carries threadedly secured to it at 49, the coupling 4 referred to in connection with Figure 1, which may be of the commercially available type disclosed in Letters Patents of the United States Nos. 2,135,221, 2,135,222 and 2,135,223. The coupling 4 which, in view of its disclosure in the aforenamed patents, need not be described here in detail, is of the type which automatically releases the coupled members upon the movement, in a given direction, of an outer bushing, here indicated by the reference 50. The coupling 4 extends outwardly of the housing 46 through an aperture 51 in a lateral closure member 52. The aperture 51 is of such a diameter as to permit the movement therethrough of the coupling 4 and the bushing 50, preventing, however, the passage of the flange formation 53 on the bushing 50. The purpose of this feature will become apparent hereinafter. The hose 5 is connected to the outermost end of the coupling 4, as already mentioned. The other side of the member 47, which extends outwardly of the housing 46 through an aperture 54 in a transverse partition 55 of the housing 46, carries secured thereto a spring support 56, which, at the same time, serves to transmit to the member 47 any manual thrust exerted by an operator on a knob or thrust receiving member 57. The knob 57 is mounted on a flanged extension 58 of the housing 46 in such a manner, that it requires to be turned through a certain angle before it may be pushed to move the member 47 along its axis. A thrust on the knob 57, to be effective, has to be of sufficient force to overcome the action of expansion springs 59 and 60, bearing against the outer side of the above mentioned partition 55, and with their other ends against the spring support 56 and the inner side of the knob 57, respectively. A sealing gasket 61 is placed adjacent the last named portion of the member 47 where it extends through the aperture 54, to prevent loss of fluid therethrough, and is held in place by a flanged washer 62 and a screw 63 threaded into the wall 55, suitably recessed for this purpose. The central portion of the member 47, disposed adjacent the piston 45, is enlarged and centrally hollowed as at 64, and provided with apertures 65, so as to permit fluid entering through the hose 5 and the coupling 4, to reach a space or cylinder 66 formed by a cylindrical extension 67 of the piston 45. The extension 67 is formed to maintain a closely sliding fit in the housing 46, and is further provided with an annular sealing gasket 68 to insure efficient utilization by the piston 45 of any fluid pressure in the cylinder 66. The cam surface 44, previously mentioned, is disposed on the extension 67, which is provided exteriorly with an annular groove 69 adapted to cooperate with the aforementioned knob 29 of the actuating pin 37, to form a latch therewith. Figure 2 indicates that the unit formed of the member 47, the piston 45 and the coupling 50 is independently movable with respect to the housing 46 and the knob 57, and that a fluid-tight seal between the inside of the coupling 4 and the housing 46 is maintained by a sealing washer 70, disposed between the coupling and the piston 45. In order to prevent unauthorized manipulation of the device, a wire seal 71, requiring its rupture before use, is provided between the knob 57 and the housing 46.

In operation, fluid from cylinder 10, released by automatic action upon the immersion of actuator 14, or by local manual actuation of the knob 17, or by remote manual operation of cable pull 13, will escape into conduit 12 and into the cylinder of fluid motor 6, the piston of which is actuated thereby to withdraw latching arrangement 8 of the compartment 9, setting free the normally enclosed life raft. The fluid is thereupon able to reach hose 5 and coupling 4. Coupling 4, which is of the conduit type, permits the operating fluid to reach the cylindrical space 66, through the hollow cylindrical portion 64 and apertures 65 of member 47. Upon the attainment of sufficient pressure in space 66, piston 45 will be caused to move toward the left as viewed in Figure 2. This movement of piston 45, against the force of spring 60, causes cam surface 44 to act against knob 29 of pin 37, and thereby to depress the pin and to unseat valve 26. The fluid stored in cylinder 2 is now free to escape through outlet 24 into conduit 18, manifold 19, and from there, to reach the compartments making up raft 1, and causing the inflation thereof. The movement of the piston 45 referred to above, carries with it coupling 4, which moves freely through aperture 51, until flange or shoulder 53 reaches closure member 52. Since flange 53 is somewhat larger than opening 51, the bushing 50 is held back at this point, while the other portions of coupling 4 and the piston 45 move toward the left, as viewed in Figure 2. Such relative movement of the bushing with respect to the coupling proper, causes the end of the hose 5 connected into coupling 4, to be set free, and to be ejected therefrom, as disclosed in principle, in the United States patents describing the coupling, referred to above. The raft, now completely inflated, and separated from its operating control connection, is thus automatically made ready for service, and is in condition to be thrown overboard. The latching of pin 37 in its actuated position in groove 69, assures complete evacuation of cylinder 2 and a satisfactory degree of inflation for the raft. Unlatching of the pin may be accomplished by an inward thrust of the coupling 4 when hose 5 is again connected thereto.

An inspection of the drawing will make it apparent, that manual local actuation of member 47, and the consequent unseating of valve 26 and the uncoupling of hose 5, follow the procedure outlined in connection with the actuation of piston 45 by fluid pressure, except that the actuating thrust to the member 47 is now supplied by knob 57. The latter alternative is provided in case the operating fluid of cylinder 10 is not available.

A rope painter 72 is shown in Figure 1, secured to a support on the plane, its other end being attached to raft 1 by means of a snap action fastening means 73. This permits the raft to be thrown overboard, the rope detaching itself as the raft falls.

Although the invention has been described with reference to an inflatable life-raft type of life-saving apparatus, it will be understood that the principle underlying the present invention may be applied to inflatable life-vests and other analogous equipment.

From the foregoing description, it is seen that I have provided an inflatable life-saving apparatus, which incorporates the objects set out at the beginning of this disclosure, and which will be recognized to constitute a decided improvement over prior devices of this character. It will also be seen that the principle of construction of the present invention embodied in the device as illustrated, may be achieved in other forms; so that, while the invention has been described with reference to the accompanying drawing, I do not wish it to be limited save as defined in the appended claims.

I claim:

1. In combination, an inflatable life raft, a compartment for holding said life raft, means normally closing said compartment, a fluid pressure medium container for inflating said raft secured thereto and in fluid flow communication therewith, fluid pressure operated fluid releasing means on said container, a remote operating fluid pressure supply for said releasing means, a conduit connecting said operating fluid supply and said releasing means, a fluid motor for operating said closing means to unclose said compartment forming a part of said conduit and controlling the flow of fluid medium therethrough, and decoupling means for said conduit associated with said releasing means and operable therewith, whereby said releasing means and said decoupling means are operated upon operation of said closing means.

2. In combination, a primary source of fluid pressure medium for inflating an inflatable device, pressure operable means operatively connected to the device for releasing the pressure medium from said source and for conducting the pressure medium into the device to effect inflation thereof, a secondary source of fluid pressure medium, conduit means operatively connecting said secondary source and said pressure operable releasing means, and decoupling means associated with said pressure operable releasing means and said conduit means for disconnecting said conduit means from said pressure operable releasing means upon release of the pressure medium of said secondary source.

3. In combination, a primary source of fluid pressure medium for inflating an inflatable device, a valve for controlling the release of the pressure medium from said source, pressure operable means for operating said valve, a secondary source of fluid pressure medium for operating said pressure operable means, conduit means for connecting said secondary source to said pressure operable means, and decoupling means associated with said pressure operable means and said conduit means for disconnecting said conduit means from said pressure operable means upon release of the pressure medium from said secondary source.

4. In combination, a primary source of fluid pressure medium for inflating an inflatable device, pressure operable means operatively connected to the device for releasing the pressure medium from said source and for conducting the pressure medium into the device to effect inflation thereof, a secondary source of fluid pressure medium, conduit means operatively connecting said secondary source and said pressure operable releasing means, decoupling means associated with said pressure operable releasing means and said conduit means for disconnecting said conduit means from said pressure operable releasing means upon release of the pressure medium of said secondary source, said releasing means including means for maintaining said releasing means in a position to insure release of the pressure medium from said primary source upon operation of said releasing means.

5. In combination, a primary source of fluid pressure medium for inflating an inflatable device, a valve for controlling the release of the pressure medium from said source, pressure operable means for operating said valve, a secondary source of fluid pressure medium for operating said pressure operable means, conduit means for connecting said secondary source to said pressure operable means, decoupling means associated with said pressure operable means and said conduit means for disconnecting said conduit means from said pressure operable means upon release of the pressure medium from said secondary source, and latching means for maintaining said valve in a position to release the pressure medium from the primary source.

6. In combination, a primary source of fluid pressure medium for inflating an inflatable device, a valve for controlling the release of the pressure medium from said source, pressure operable means having a piston for operating said valve, a secondary source of fluid pressure medium for operating said pressure operable means, conduit means for connecting said secondary source to said pressure operable means, and decoupling means associated with said piston and said conduit means for disconnecting said conduit means from said pressure operable means upon release of the pressure medium from said secondary source.

7. In combination, a primary source of fluid pressure medium for inflating an inflatable device, a valve for controlling the release of the pressure medium from said source, pressure operable means having a piston for operating said valve, latching means associated with said piston for maintaining said pressure operable means in a position to cause said valve to release the pressure medium from said primary source, a secondary source of fluid pressure medium for operating said pressure operable means, conduit means for connecting said secondary source to said pressure operable means, and decoupling means associated with said piston and said conduit means for disconnecting said conduit means from said pressure operable means upon release of the pressure medium from said secondary source.

8. In combination, an inflatable device, a storage compartment for said device, means for closing said compartment, a primary source of fluid pressure medium for inflating said device, pressure operable means operatively connected to said device for releasing the pressure medium from said source and for conducting the pressure medium into said device to effect inflation thereof, a secondary source of fluid pressure medium for operating said pressure operable releasing means, conduit means operatively connecting said secondary source and said pressure operable releasing means, and pressure operable means in said conduit means for rendering said compartment closing means ineffective.

9. In combination, an inflatable device, a storage compartment for said device, means for closing said compartment, a primary source of fluid pressure medium for inflating said device, primary pressure operable means operatively connected to said device for releasing the pressure medium from said primary source and for conducting the pressure medium into said device to effect inflation thereof, a secondary source of fluid pressure medium for operating said primary pressure operable means, conduit means operatively connecting said secondary source and said primary pressure operable means, secondary pressure operable means in said conduit means for rendering said compartment closing means ineffective, and decoupling means associated with said primary pressure operable means and said conduit means for disconnecting said conduit means from said last mentioned pressure operable means upon release of the pressure medium from said secondary source.

10. In a fluid releasing device, in combination with a container of fluid pressure medium, a valve for the container, cam means adapted to effect unseating of said valve, a pressure operable piston adapted to operate said cam means, a source of fluid pressure medium for operating said piston, conduit means connected to said source, and coupling means for operatively connecting said conduit means to said piston, said coupling means having latching means adapted to be rendered ineffective upon operation of said piston to disconnect said conduit means and said piston.

11. In a fluid releasing device, in combination with a container of fluid pressure medium, a valve for the container, cam means adapted to effect unseating of said valve, a pressure operable piston adapted to operate said cam means, a source of fluid pressure medium for operating said piston, means for latching said cam means in a position to maintain said valve unseated upon operation of said piston, conduit means connected to said source, and coupling means for operatively connecting said conduit means to said piston, said coupling means having latching means adapted to be rendered ineffective upon operation of said piston to disconnect said conduit means and said piston.

HENRY ERNEST HEIGIS.